United States Patent [19]

Lirones et al.

[11] 3,957,715

[45] May 18, 1976

[54] CASTING OF HIGH MELTING POINT METALS AND CORES THEREFOR

[75] Inventors: Nick G. Lirones; David H. Sturgis, both of North Muskegon, Mich.

[73] Assignee: Howmet Corporation, Greenwich, Conn.

[22] Filed: Nov. 21, 1974

[21] Appl. No.: 525,999

Related U.S. Application Data

[63] Continuation of Ser. No. 322,421, Jan. 10, 1973, abandoned.

[52] U.S. Cl. ............................ 260/37 SB; 106/38.2; 106/38.3; 106/38.35; 164/43; 260/DIG. 40; 264/63; 264/66
[51] Int. Cl.² ........................................... C08L 83/04
[58] Field of Search ............... 106/38.2, 38.22, 38.3, 106/38.35; 260/37 SB, DIG. 40; 164/43; 264/66, 63

[56] References Cited
UNITED STATES PATENTS

| | | | |
|---|---|---|---|
| 3,090,691 | 5/1963 | Weyer | 260/37 SB |
| 3,170,890 | 2/1965 | Boyd et al. | 260/37 SB |
| 3,257,692 | 6/1966 | Operhall | 106/38.9 |
| 3,505,278 | 4/1970 | Elarde et al. | 260/37 SB |
| 3,627,729 | 12/1971 | Trego | 260/37 SB |
| 3,647,741 | 3/1972 | Hutchinson | 260/37 SB |
| 3,686,006 | 8/1972 | Horton | 106/38.3 |

*Primary Examiner*—Lorenzo B. Hayes

[57] ABSTRACT

This invention is addressed to cores for use in the casting of high melting point metals wherein the core is formed of a refractory material, a silicone resin and a catalyst in the form of an anhydride of an organic carboxylic acid.

31 Claims, No Drawings

CASTING OF HIGH MELTING POINT METALS AND CORES THEREFOR

This is a continuation of application Ser. No. 322,421, filed Jan. 10, 1973, now abandoned.

This invention relates to cores useful in the casting of high melting point metals, such as super alloys having a nickel or cobalt base, titanium, zirconium, niobium tungsten and other metals in Group IV-B of the Periodic Table. Specifically, the invention relates to cores of complex shape which may be employed in the casting of such metals in ceramic shell molds.

In the power plants for missiles and turbine drives, use is made of blades, vanes, cones and other structural parts that are required to withstand extremely high temperature under extremely corrosive conditions.

In order to combat these problems of high heat and corrosion, the power plants have been designed to make use of such high melting point metals as titanium, zirconium and hafnium, as well as super alloys. The temperatures encountered in some of the newer aircraft and turbine equipment have placed new demands upon such elements. To overcome the problem, further design modifications have been made, particularly in turbine blade construction. In such devices, it is now common practice to introduce a series of internal cooling vents or channels to effectuate an amount of cooling by the flow of air or other fluid coolant therethrough.

When designing such air cooled type structures, it is desirable to maximize the surface area for heat transmission but without reducing the structural strength of the component.

Air cooled structures of the type described, particularly turbine components of high melting point metals have been manufactured by the precision casting technique, using shell molds.

Difficulties have been experienced in the preparation of cores capable of use in the shell molding process for providing the cooling channels in the cast metal products. A primary area of difficulty consists of the need for finding a suitable core material which would withstand the rigors of the casting process, and a particularly troublesome problem is presented where large cores are used in producing high melting point castings by reason of the difficulty in maintaining the necessary close tolerances.

U.S. Pat. No. 3,125,787 describes a method for the preparation of cores in which an expendable pattern having the general shape of the core to be produced is first coated with molybdenum and then provided with an additional coating of a metal which is difficult to oxidize and which has a melting point above the casting temperature of the metal to be cast about the core, with the coatings being of sufficient thickness to be self-supporting. Thereafter, the expendable pattern is removed from the coatings and the interior thus formed is filled with solid material which is capable of remaining in the solid state at temperatures above 1000°F.

In U.S. Pat. No. 3,142,875, description is made of another method for the preparation of cores in which a core material is coated with a film of a metal which is difficult to oxidize and which has a high melting point.

Cores of the type described are expensive and difficult to produce.

In copending application Ser. No. 181,463, filed Sept. 17, 1971 and entitled "Method of Casting Metals," description is made of an improved process for the cored casting of metals having high melting points in which use is made of cores prepared by forming a composition of a filler material and a silicone resin into the desired core configuration and then firing the resulting core configuration to convert the silicone resin into a siliceous material which serves to bond the filler in the desired preformed core configuration to form a core which is dimensionally stable during the casting operation.

One of the primary advantages of the use of a silicone resin is that the composition of the filler and silicone resin can be conveniently and inexpensively formed into complex core configurations by conventional molding operations such as by compression molding, transfer molding, injection molding, etc. In addition, cores prepared using silicone resins as the binding agent are very strong in the green or unfired state, and thus maintain their integrity during molding and bonding operations which may take place prior to firing. The green cores are also characterized by a significantly reduced proportion of volatile material as compared to cores prepared using other binding agents, with the result that the cores are subject to less shrinkage during firing to retain their original dimensions.

While the cores described in the foregoing copending application represent a significant advance in the art of casting high melting metals, they are nevertheless subject to certain disadvantages. The core composition of filler and silicone resin is generally formulated to include a catalyst to aid in the cure of the silicone resin in the formation of the preformed core configuration. Catalyst systems most frequently used in the cure of the silicone resins are metal compounds which are low temperature melting, low temperature vaporizing or otherwise unstable during the casting operation. The result is that alloys surrounding the cores pick up small amounts of the metal component of the catalyst system as a contaminant, and this contaminant can alter the properties of the metal or alloy being cast. For example, catalyst systems such as lead oxide, zinc oxide and other heavy metal oxides, have been found to produce contamination of the metal cast in amounts exceeding the material specification.

It is accordingly an object of the present invention to produce and to provide a method for producing cores for use in the casting of high melting metals which do not produce contamination of the metal being cast.

It is a more specific object of the invention to produce and to provide a method for producing cores for casting of high melting metals in which preformed cores of filler and silicone resin are cored with a catalyst system which does not serve to contaminate the metal cast in the use of such cores.

It is a related object of the invention to provide a method for core casting high melting metals using the improved cores of the invention.

The concepts of the present invention reside in an improved core composition for use in the preparation of cored castings of high melting metals formed of filler material, a silicone resin and a catalyst system containing, as the essential component, an anhydride of an organic carboxylic acid. It has been found that the catalyst system of the present invention serves to accelerate cure of the silicone resin binding agent of the performed core configuration to produce a core which can be fired and used in the cored casting of high melting metals without contaminating the high melting metal with metallic components of the catalyst which can adversely affect the metal being cast.

The essential component of the catalyst system of the present invention is the anhydride of an organic carboxylic acid. A wide variety of anhydrides can be used in the practice of the invention, although some are more effective than others. In general, use can be made of anhydrides of aromatic, aliphatic and cycloaliphatic mono- and di-carboxylic acids containing 4 to 30 carbon atoms and preferably 8 to 20 carbon atoms. Preferred anhydrides are those having the general formula

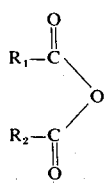

wherein $R_1$ and $R_2$ are each selected from the group consisting of an aryl group, and particularly a monocyclic carbocyclic or a bicyclic carbocyclic aryl group, containing 6 to 12 carbon atoms (e.g. phenyl, tolyl, benzyl, naphthyl, etc.); an alkyl group containing 2 to 14 carbon atoms (e.g., propyl, butyl, pentyl, heptyl, etc.); and a cycloalkyl group containing 4 to 12 carbon atoms (e.g., cyclopentyl, cyclohexyl, methylcyclohexyl, etc.). In addition, $R_1$ and $R_2$ together can define one of the foregoing groups, or an alkenylene, group containing 2 to 8 carbon atoms (e.g., ethenylene, propenylene, etc.).

Representatives of the foregoing anhydrides are phthalic anhydride, benzoic anhydride, isobutyric anhydride, cyclohexanoic anhydride, maleic anhydride, camphoric anhydride, diphenic anhydride, isatoic anhydride, etc. In general, the aromatic anhydrides are preferred.

In accordance with one embodiment of the invention, the catalyst system can be formulated to include, in addition to the carboxylic acid anhydride, magnesium oxide (MgO). It has been found that this oxide serves to further increase the rate of cure of the silicone resin without introducing any source of contamination of the metal cast.

The amount of such oxides can generally be varied within wide limits. For best results, the oxide constitutes less than 60% by weight of total catalyst system, and preferably 1 to 55% by weight.

The total amount of the catalyst system of the invention employed in the core molding composition can be varied within wide ranges. Best results are usually achieved when the catalyst system is present in an amount within the range of 0.1 to 3% by weight based on the weight of the silicone resin.

A wide variety of silicone resins can be used in the practice of this invention. Preferred resins are the siloxanes of the type described in U.S. Pat. Nos. 3,090,691 and 3,108,985 and include any organic siloxane in which the substituent groups are hydrogen atoms or organic radicals attached directly to the silicone atoms. In general, the siloxanes employed in the practice of this invention contain 1 to 3 hydrogen and/or organic substituents per silicon atom, and the organic group contains 1-12 carbon atoms, optionally substituted by a group containing an oxygen atom and/or a nitrogen atom. As used herein, the term "siloxane" is intended to refer to and include a material which contains at least one linkage per molecule:

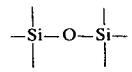

Siloxane resins which can be employed in the practice of this invention include dimethyl siloxane, monomethyl siloxane, phenylmethyl siloxane, monophenyl siloxane, diphenyl siloxane, monethyl siloxane, ethylmethyl siloxane, diethyl siloxane, phenylethyl siloxane, monopropyl siloxane, ethylpropyl siloxane, divinyl siloxane, monovinyl siloxane, ethyl vinyl siloxane, phenyl vinyl siloxane, diallyl siloxane, monoallyl siloxane, allylethyl siloxane, allylvinyl siloxane, monocyclohexyl siloxane, gamma-hydroxypropylmethyl siloxane, beta-methoxyethylmethyl siloxane, gamma-carboxypropyl siloxane, gamma-aminopropyl siloxane, gamma-cyanopropylmethyl siloxane, etc.

As the filler material, use can be made of a variety of filler materials of the type used in the preparation of molds and core materials in the casting of the Group IVB metals including refractory or ceramic materials, such as silica, alumina, zircon, etc., as well as combinations thereof. As indicated above, the filler particles are bonded together by a siliceous bond on firing of the preformed core as a result of partial decomposition of the siloxane resin. The bulk density, apparent density, apparent porosity and other properties of the baked or fired core can be controlled by varying the relative proportions of the filler and siloxane resin, by varying the size distribution of the ceramic particles employed in the molding core composition and/or by adding to the molding core composition graphite and/or wood flour which burn out on firing to increase the porosity of the core.

In general, best results when silica is the primary filler are usually obtained when the baked or fired core has a bulk density within the range of 1 to 3 g/ml. and preferably 1.4 to 2.0 g/ml. This usually corresponds to an apparent solid density of 1.80 to 2.50 g/ml and an apparent porosity of 15 to 35 percent. For this purpose, use is made of filler material having particle sizes within the range of 100 to 400 mesh. For most applications, use is made of from 50 to 95 parts by weight filler for each 5 to 50 parts by weight resin.

In addition to the ceramic fillers described above, it is possible and sometimes desirable to make use of graphite as the filler material in combination with a silicone resin as described above for molding a pre-formed core configuration. On baking and firing, a carbon and/or graphite bond is formed in addition to the siliceous bond to form the desired core having a minimum bulk density of 1.2 g/ml. Such graphite cores are particularly useful in the production of intricately cored, precision cast titanium components.

In addition to the filler, silicone resin and catalyst components, the molding composition can also be formulated to include, if desired, a plasticizer for the silicone resin to improve its working characteristics during molding of the composition in the preparation of a pre-formed core. As the plasticizer component, use can be made of any of a variety of plasticizers for silicone resins as represented by paraffin waxes, styrene, phenol or low molecular weight phenolic resins, fatty amines such as N,N'-distearyl ethylenediamine, etc. The amount of plasticizer in the molding composition may be conveniently varied from 0 to 7% by weight of the resin content of the molding composition.

Any of a number of additives, such as parting agents or lubricants may be added to the molding composition in the practice of this invention to improve the processing characteristics of the molding composition during molding in the preparation of the pre-formed core configuration. Representative materials include, for example, calcium stearate as well as other metal salts of fatty acids.

The molding composition can be formulated in accordance with well known mixing techniques, including dry blending, wet mixing, hot mixing, etc., and then molded in a conventional manner using conventional molding techniques, such as transfer molding, injection molding, compression molding. Molding parameters including pressures, die temperatures, compound temperatures and cure times vary, depending somewhat on the configuration of the core being molded and the particular composition of the molding composition. Typical pressure ranges normally used for transfer or injection molding are 100 to 10,000 psi, and 100 to 5,000 psi for compression molding. Compound and die temperatures usually range from room temperature up to about 400°F. and are timed from 1 to 10 minutes.

After the molding composition has been formed into the desired preformed core configuration, the preformed core is cured, baked and fired to convert the silicone resin into a siliceous material to bond the filler material forming the core. Baking and firing parameters are similarly dependent on the configuration of the core and the formulation of the molding composition. In general, baking temperatures range up to above 400°F. and firing temperatures range up to about 2200°F. for times up to 10 hours or more. It is frequently preferred to heat the preformed core slowly to the desired temperature while maintaining the core at one or more intermediate temperatures for two hours or more. One baking and firing schedule which can be used in the practice of this invention is to heat the preformed core at the rate of 100°F. per hour until a temperature of 1200°F. is reached, then maintaining the temperature at 1200°F. is reached, then maintaining the temperature at 1200°F. for about 4 hours, followed by heating at the rate of 100°F. per hour to a temperature of about 2050°F. and maintaining the latter temperature for a period of about 4 hours. Thereafter, the core can be furnace cooled to room temperature.

Depending on their size and configuration, some molded cores can be processed through the baking and firing cycles without support. However, it has been found that it is generally desirable to position the preformed core in a closed ceramic setter which conforms to the configuration of the core to accurately support the core throughout the baking and firing operations.

After the cores have been fired and cooled to room temperature, they are ready for use in the formation of molds for the casting of metals having high melting points, and particularly the Group IVB metals, as by the shell molding process. A complete description of such casting processes may be found in Operhall U.S. Pat. No. 2,961,751, the disclosure of which is incorporated herein by reference. Briefly described, the casting technique described in the foregoing patent involves embedding one or more cores prepared in accordance with the present invention in an expendable pattern whereby the ends of the core or cores extend outwardly of the expendable pattern. Thereafter, a ceramic shell mold is formed about the expendable pattern in a conventional manner and the pattern is removed from the mold. A molten metal or alloy is then introduced to the resulting mold to form the casting which is provided with cores having the configuration of the core or cores embedded in the pattern.

Since the cores prepared in accordance with the practice of this invention can be formed by conventional molding techniques, the cores can be simply and economically produced with improved accuracy. The preformed cores have been found to possess excellent dimensional stability on contact with molten metals of the type described, and thereby serve to further improve the overall quality of the resulting casting.

Having described the basic concepts of the invention, reference is now made to the following examples, which are provided by way of illustration and not by way of limitation, of the practice of this invention in the preparation of preformed cores and the use of such cores in the preparation of cored castings by the shell molding technique. All percentages are in % by weight unless otherwise specified.

EXAMPLE 1

A core molding composition is formulated as follows:

| Refractory Filler | | | 79.5 % |
|---|---|---|---|
| 61.8% | 70 | Mesh Fused Silica | |
| 20.6 | −325 | Mesh Fused Silica | |
| 8.6 | 70 | Mesh Zircon | |
| 2.9 | −325 | Mesh Zircon | |
| 4.6 | 120 | Mesh Alumina | |
| 1.5 | −325 | Mesh Alumina | |
| Silicone Resin Dow Corning 63817 Resin | | | 19.4 |
| Internal Lubricant Calcium Stearate | | | 0.5 |
| Catalyst 50% Superfine MgO 50% Benzoic Anhydride | | | 0.6 |
| | | | 100.0% |

The foregoing composition is then formed into the desired configuration. Thereafter, the preformed core is heated to a temperature of about 350°F. for three minutes to cure the resin, and then the core is heated at the rate of 50°F. to 100°F. per hour until the temperature of the core reaches 1200°F. and the core is maintained at this temperature for about four hours. The core is then heated at the rate of 100°F. per hour until the temperature reaches 2050°F. at which point the core is maintained at 2050°F. to complete the baking and firing cycle and convert the resin to a siliceous material to bond the ceramic filler particles together.

After cooling to room temperature, the complete core is used in the casting of high melting metals by a shell casting technique as described in the foregoing Operhall patent. Cores produced in the manner described are embedded in an expendable wax pattern, and a ceramic mold is formed over the pattern. Thereafter, the wax is removed to leave at least the ends of the cores fixed in the walls of the shell mold to maintain the cores in the desired positions. Molten metal is poured into the shell mold containing the cores whereby the cores provide the desired cored arrangement for the finished casting.

Additional examples of molding compositions embodying the concepts of this invention may be illustrated by the following:

EXAMPLE 2

| Refractory Filler | | | 83.2% |
|---|---|---|---|
| 61.8% | 70 | Mesh Fused Silica | |
| 20.6 | −325 | Mesh Fused Silica | |
| 8.6 | 70 | Mesh Zircon | |
| 2.9 | −325 | Mesh Zircon | |
| 4.6 | 120 | Mesh Alumina | |
| 1.5 | −325 | Mesh Alumina | |

| | |
|---|---|
| Silicone Resin<br>G.E. 355 Resin | 15.7 |
| Internal Lubricant<br>Calcium Stearate | 0.5 |
| Catalyst<br>50% Superfine MgO<br>50% Benzoic Anhydride | 0.6 |
| | 100.0% |

EXAMPLE 3

| Refractory Filler | | | 84.0 to 84.6% |
|---|---|---|---|
| 61.8% | 70 | Mesh Fused Silica | |
| 20.6 | −325 | Mesh Fused Silica | |
| 8.6 | 70 | Mesh Zircon | |
| 2.9 | −325 | Mesh Zircon | |
| 4.6 | 120 | Mesh Alumina | |
| 1.5 | −325 | Mesh Alumina | |

| | |
|---|---|
| Silicone Resin<br>Dow Corning 63817 or G.E. 355 Resins | 14.0 |
| Internal Lubricant<br>Calcium Stearate | 0.5 |
| Plasticizer<br>N,N'-Distearyl Ethylenediamine | 0.7 |
| Catalyst<br>50% Superfine MgO<br>50% Benzoic Anhydride | 0.2 to 0.8 |

EXAMPLE 4

| Refractory Filler | | | 79.5% |
|---|---|---|---|
| 21.7% | −80 | Mesh Fused Silica | |
| 20.0 | −100 | Mesh Fused Silica | |
| 40.7 | −325 | Mesh Fused Silica | |
| 6.1 | −325 | Mesh Alumina Flour | |
| 11.2 | −325 | Mesh Zircon Flour | |

| | |
|---|---|
| Silicone Resin<br>Dow Corning 63817 or G.E. 355 Resins | 19.4 |
| Internal Lubricant<br>Calcium Stearate | 0.5 |
| Catalyst<br>50% Superfine MgO<br>50% Phthalic Anhydride | 0.6 |
| | 100.0% |

EXAMPLE 5

| Refractory Filler | | | 83.2% |
|---|---|---|---|
| 21.7% | −80 | Mesh Fused Silica | |
| 20.0 | −100 | Mesh Fused Silica | |
| 40.7 | −325 | Mesh Fused Silica | |
| 6.1 | −325 | Mesh Alumina Flour | |
| 11.2 | −325 | Mesh Zircon Flour | |

| | |
|---|---|
| Silicone Resin<br>Dow Corning 63817 or G.E. 355 Resins | 15.7 |
| Internal Lubricant<br>Calcium Stearate | 0.5 |
| Catalyst<br>50% Superfine MgO<br>50% Benzoic Anhydride | 0.6 |
| | 100.0% |

EXAMPLE 6

| Refractory Filler by Weight | | | 84.0 to 84.6% |
|---|---|---|---|
| 21.7% | −80 | Mesh Fused Silica | |
| 20.0 | −100 | Mesh Fused Silica | |
| 40.7 | −325 | Mesh Fused Silica | |
| 6.1 | −325 | Mesh Alumina Flour | |
| 11.2 | −325 | Mesh Zircon Flour | |

| | |
|---|---|
| Silicone Resin by Weight<br>Dow Corning 63817 or G.E. 355 Resins | 14.0 |
| Internal Lubricant by Weight<br>Calcium Stearate | 0.5 |
| Plasticizer by Weight<br>N,N'-Distearyl Ethylenediamine | 0.7 |
| Catalyst by Weight<br>50% Superfine MgO<br>50% Camphoric Anhydride | 0.2 to 0.8 |

EXAMPLE 7

| Refractory Filler | | | 79.5% |
|---|---|---|---|
| 75% | 70 | Mesh Fused Silica | |
| 25% | −325 | Mesh Fused Silica | |

| | |
|---|---|
| Silicone Resin<br>Dow Corning 63817 or G.E. 355 Resins | 19.4 |
| Internal Lubricant<br>Calcium Stearate | 0.5 |
| Catalyst<br>50% Superfine MgO<br>50% Diphenic Anhydride | 0.6 |
| | 100.0% |

EXAMPLE 8

| Refractory Filler | | | 83.2% |
|---|---|---|---|
| 75% | 70 | Mesh Fused Silica | |
| 25% | −325 | Mesh Fused Silica | |

| | |
|---|---|
| Silicone Resin<br>Dow Corning 63817 or G.E. 355 Resins | 15.7 |
| Internal Lubricant<br>Calcium Stearate | 0.5 |
| Catalyst<br>50% Superfine MgO<br>50% Benzoic Anhydride | 0.6 |
| | 100.0% |

EXAMPLE 9

| Refractory Filler | | | 84.0 to 84.6% |
|---|---|---|---|
| 75% | 70 | Mesh Fused Silica | |
| 25% | −325 | Mesh Fused Silica | |

| | |
|---|---|
| Silicone Resin<br>Dow Corning 63817 or G.E. 355 Resins | 14.0 |
| Internal Lubricant<br>Calcium Stearate | 0.5 |
| Plasticizer<br>N,N'-Distearyl Ethylenediamine | 0.7 |
| Catalyst<br>50% Benzoic Anhydride | 0.2 to 0.8 |

EXAMPLE 10

| Refractory Filler | | | 79.5% |
|---|---|---|---|
| 61.8% | 70 | Mesh Fused Silica | |
| 20.6 | −325 | Mesh Fused Silica | |
| 8.6 | 70 | Mesh Zircon | |
| 2.9 | −325 | Mesh Zircon | |
| 4.6 | 120 | Mesh Alumina | |
| 1.5 | −325 | Mesh Alumina | |
| 1.0–10.0 | −200 | Mesh Graphite, Carbon or Wood Flour | |

| | |
|---|---|
| Silicone Resin<br>Dow Corning 63817 of G.E. 355 Resins | 19.4 |
| Internal Lubricant<br>Calcium Stearate | 0.5 |
| Catalyst<br>50% Superfine MgO<br>50% Benzoic Anhydride | 0.6 |
| | 100.0% |

EXAMPLE 11

| Refractory Filler | | | 83.2% |
|---|---|---|---|
| 61.8% | 70 Mesh | Fused Silica | |
| 20.6 | −325 Mesh | Fused Silica | |
| 8.6 | 70 Mesh | Zircon | |
| 2.9 | −325 Mesh | Zircon | |
| 4.6 | 120 Mesh | Alumina | |
| 1.5 | −325 Mesh | Alumina | |
| 1.0–10.0 | −200 Mesh | Graphite, Carbon or Wood Flour | |

| Silicone Resin | 15.7 |
|---|---|
| Dow Corning 63817 or G.E. 355 Resins | |

| Internal Lubricant | 0.5 |
|---|---|
| Calcium Stearate | |

| Catalyst | 0.6 |
|---|---|
| 50% Superfine MgO | |
| 50% Benzoic Anhydride | |
| | 100.0% |

EXAMPLE 12

| Refractory Filler | | | 84.0 to 84.6% |
|---|---|---|---|
| 61.8% | 70 Mesh | Fused Silica | |
| 20.6 | −325 Mesh | Fused Silica | |
| 8.6 | 70 Mesh | Zircon | |
| 2.9 | −325 Mesh | Zircon | |
| 4.6 | 120 Mesh | Alumina | |
| 1.5 | −325 Mesh | Alumina | |
| 1.0–10.0 | −200 Mesh | Graphite, Carbon or Wood Flour | |

| Silicone Resin | 14.0 |
|---|---|
| Dow Corning 63817 or G.E. 355 Resins | |

| Internal Lubricant | 0.5 |
|---|---|
| Calcium Stearate | |

| Plasticizer | 0.7 |
|---|---|
| N,N'-Distearyl Ethylenediamine | |

| Catalyst | 0.2 to 0.8 |
|---|---|
| 50% Superfine MgO | |
| 50% Isatoic Annydride | |

EXAMPLE 13

| Refractory Filler | | | 79.5% |
|---|---|---|---|
| 21.7% | −80 Mesh | Fused Silica | |
| 20.0 | −100 Mesh | Fused Silica | |
| 40.7 | −325 Mesh | Fused Silica | |
| 6.1 | −325 Mesh | Alumina Flour | |
| 11.2 | −325 Mesh | Zircon Flour | |
| 1.0–10.0 | −200 Mesh | Graphite, Carbon or Wood Flour | |

| Silicone Resin | 19.4 |
|---|---|
| Dow Corning 63817 or G.E. 355 Resins | |

| Internal Lubricant | 0.5 |
|---|---|
| Calcium Stearate | |

| Catalyst | 0.6 |
|---|---|
| 50% Superfine MgO | |
| 50% Benzoic Anhydride | |
| | 100.% |

Each of the molding compositions illustrated in Examples 2 to 13 can be formed into the desired core configurations by conventional molding techniques including transfer, injection or compression molding techniques and treated and used in accordance with the procedure of Example 1.

It will be understood that various changes and modifications can be made in the details of procedure, formulation and use without departing from the spirit of the invention, especially as defined in the following claims.

We claim:

1. A method for the preparation of rigid cores for use in the casting of high melting point metals selected from the group consisting of nickel, cobalt, titanium, zirconium, hafnium, niobium and tungsten comprising forming a core composition consisting essentially of a refractory filler, a curable silicone resin and a catalyst system to cure the silicone resin consisting essentially of a catalyst selected from the group consisting of an anhydride of an organic carboxylic acid and a mixture of an anhydride of an organic carboxylic aicd and magnesium oxide into a core configuration, and baking and firing the core configuraion to effect cure of the silicone resin and to convert the silicone resin into a siliceous material to bond the filler and define a dimensionally stable, rigid core.

2. A method as defined in claim 1 wherein the filler is selected from the group consisting of silica, alumina, zircon and graphite.

3. A method as defined in claim 1 wherein the silicone resin is a siloxane.

4. A method as defined in claim 3 wherein the siloxane contains 1 to 3 groups selected from the group consisting of hydrogen and an organic group containing 1–12 carbon atoms.

5. A method as defined in claim 1 wherein the core configuration is formed by molding.

6. A method as defined in claim 1 wherein the composition conains 50–95 parts by weight filler for each 5–50 parts by weight resin.

7. A method as defined in claim 1 wherein the catalyst system is a present in an amount within the range of 0.05 to 3.0% by weight based on the weight of the resin.

8. A method as defined in claim 1 wherein the composition includes a plasticizer for the silicone resin.

9. A method as defined in claim 1 wherein the preformed core configuration is baked and fired at a temperature up to 2200°F.

10. A method as defined in claim 1 wherein the preformed core configuration is slowly heated to an intermediate baking temperature and then slowly heated to the firing temperature.

11. A method as defined in claim 1 wherein the anhydride is selected from the group consisting of anhydrides of aromatic, aliphatic and cycloaliphatic mono- and di-carboxylic acids.

12. A method as defined in claim 1 wherein the anhydride has the formula

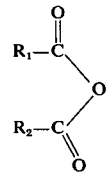

wherein $R_1$ and $R_2$ are each selected from the group consisting of aryl, alkyl, and cycloalkyl, or $R_1$ and $R_2$ together define an aryl group, an alkylene group, a cycloalkylene group and an alkenylene group.

13. A method as defined in claim 1 whrein the anhydride is an aromatic anhydride.

14. A method as defined in claim 1 wherein the anhydride is selected from the group consisting of phthalic and benzoic anhydrides.

15. A rigid core for use in the casting of high melting point metals selected from the group consisting of nickel, cobalt, titanium, zirconium, hafnium, niobium and tungsten formed by shaping and firing a composition consisting essentially of a refractory filler, a curable silicone resin and a catalyst system for cure of the resin consisting essentially of a catalyst selected from the group consisting of an anhydride of an organic carboxylic aicd and a mixture of an anhydride of an organic carboxylic acid and magnesium oxide.

16. A core as defined in claim 15 wherein the filler is selected from the group consisting of silica, alumina, zircon and graphite.

17. A core as defined in claim 15 wherein the silicone resin is a siloxane.

18. A core as defined in claim 17 wherein the siloxane contains 1 to 3 groups selected from the group consisting of hydrogen and an organic group containing 1-12 carbon atoms.

19. A core as defined in claim 15 wherein the composition contains 50-95 parts by weight filler for each 5-50 parts by weight resin.

20. A core as defined in claim 15 wherein the catalyst system is present in an amount within the range of 0.05 to 3.0% by weight based on the weight of the resin.

21. A core as defined in claim 15 wherein the anhydride is selected from the group consisting of anhydrides of aromatic, aliphatic and cycloaliphatic mono- and di-carboxylic acids.

22. A core as defined in claim 15 wherein the anhydride has the formula

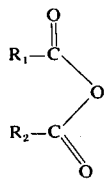

wherein $R_1$ and $R_2$ are each selected from the group consisting of aryl, alkyl, and cycloalkyl, or $R_1$ and $R_2$ together define an aryl group, an alkylene group, a cycloalkylene group and an alkenylene group.

23. A core as defined in claim 15 wherein the anhydride is an aromatic anhydride.

24. A core as defined in claim 15 wherein the anhydride is selected from the group consisting of phthalic and benzoic anhydrides.

25. A core as defined in claim 15 which has been baked to cure the resin.

26. In the method for preparation of cored castings of metals selected from the group consisting of nickel, cobalt, titanium, zirconium, hafnium, niobium and tungsten, having high melting points, wherein one or more cores is embedded in an expendable pattern, a ceramic shell mold is formed around the pattern and the pattern is removed for the pouring of a molten metal, the improvement comprising forming a core composition consisting essentially of a refractory filler, a curable silicone resin and a catalyst system to cure the silicone resin consisting essentially of a catalyst selected from the group consisting of an anhydride of an organic carboxylic acid and a mixture of an anhydride of an organic carboxylic acid and magnesium oxide into a rigid core configuration, and baking and firing the core configuration to effect cure of the silicone resin into a siliceous material to bond the filler.

27. A method as defined in claim 26 wherein the filler is selected from the group consisting of silica, alumina, zircon and graphite.

28. A method as defined in claim 26 wherein the silicone resin is a siloxane.

29. A method as defined in claim 26 wherein the preformed core configuration is baked and tired at a temperature up to 2200°F.

30. A method as defined in claim 26 wherein the preformed core configuration is slowly heated to an intermediate baking temperature and then slowly heated to the firing temperature.

31. A method as defined in claim 26 wherein the catalyst system comprises phthalic and/or benzoic anhydride.

* * * * *